United States Patent [19]

Carty

[11] 4,204,463

[45] May 27, 1980

[54] STACK DESIGN

[76] Inventor: Jack Carty, 2 Model Ct., Rocky Point, N.Y. 11778

[21] Appl. No.: 925,835

[22] Filed: Jul. 18, 1978

[51] Int. Cl.$^2$ ............................................. F23L 17/02
[52] U.S. Cl. ........................................ 98/58; 110/184; 122/20 B; 165/DIG. 2; 126/442; 126/444
[58] Field of Search ....................................... 98/58–60; 110/184; 237/55; 122/20 B; 165/DIG. 2

[56] References Cited

U.S. PATENT DOCUMENTS

| | | | |
|---|---|---|---|
| 1,311,702 | 7/1919 | Mathis | 122/20 B |
| 2,080,229 | 5/1937 | Ray | 122/20 B |
| 2,508,615 | 5/1950 | Lukes | 98/59 |
| 2,926,489 | 3/1960 | Halford et al. | 251/212 |
| 2,934,892 | 5/1960 | Hurlbert et al. | 251/212 |
| 2,969,142 | 1/1961 | Mack | 251/212 |
| 3,181,451 | 5/1965 | Hess | 98/59 |
| 3,727,566 | 4/1973 | Roy | 110/184 |
| 4,030,629 | 6/1977 | Melnikov | 251/212 |
| 4,095,514 | 6/1978 | Roy et al. | 251/212 |
| 4,111,107 | 9/1978 | Engleke | 110/184 |

FOREIGN PATENT DOCUMENTS 2242495  3/1973  Fed. Rep. of Germany ............... 98/59

*Primary Examiner*—Henry C. Yuen

*Attorney, Agent, or Firm*—Allen R. Morganstern

[57] ABSTRACT

This invention relates to an improved design associated with the fabrication and construction of a chimney stack capable of conveying hot gases generated in conjunction with industrial endeavors to a height within the atmosphere sufficient to meet current pollution standards, as well as providing a means to dampen stack vibrations plus incorporating a heat extracting system capable of providing a secondary source of heat for utilization outside of the stack confines. In accordance with the invention, there is incorporated within one overall design, a stack capable of conveying hot gases wherein there is provided means for selectively adjusting the opening appearing at the top of said stack, so as to maintain control over the gas velocity as well as plume rise of emitted gases. Additionally, there is provided in conjunction with said design, means for dampening the movement of said stack caused by either internal or external forces as well as means for extracting energy from the passage of hot gases through said stack for utilization in external applications. Furthermore, there is additionally incorporated within the overall design, means for converting the solar energy which strikes the exterior surface of the chimney stack into a useable energy form for utilization outside of the chimney stack environment.

5 Claims, 9 Drawing Figures

U.S. Patent  May 27, 1980  Sheet 1 of 3  4,204,463
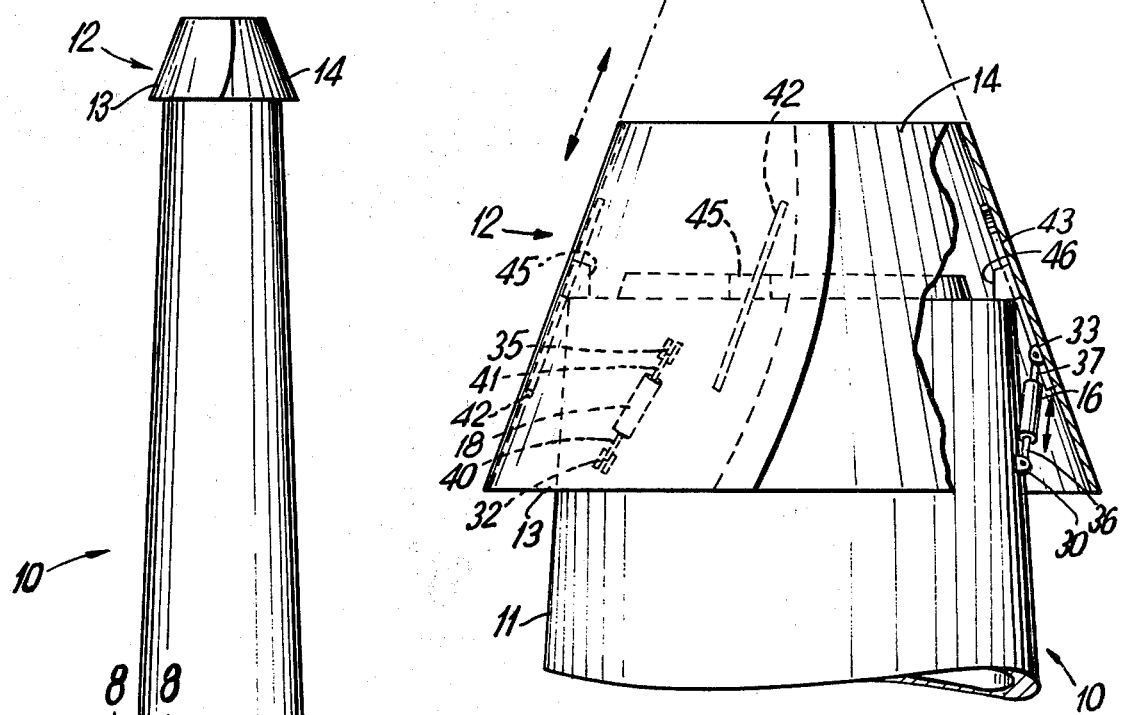
FIG. 2
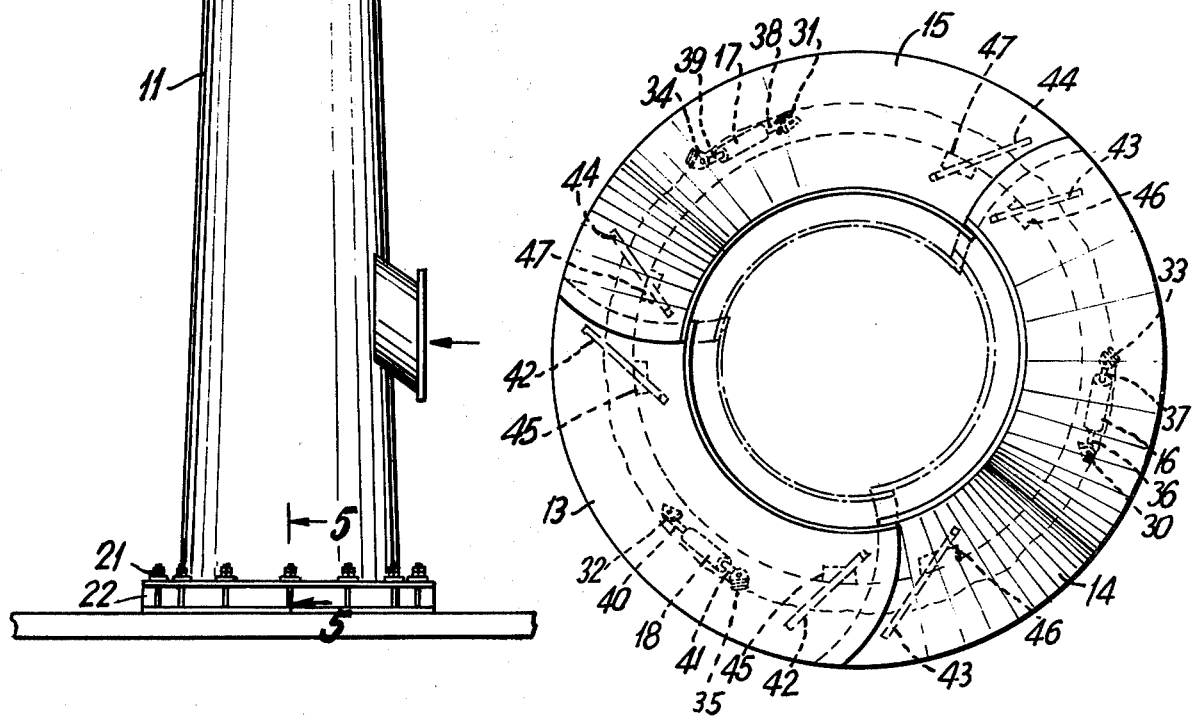
FIG. 1
FIG. 3

STACK DESIGN

BACKGROUND AND OBJECTS OF THE INVENTION

The present invention relates generally to a new and improved design associated with the fabrication and construction of a chimney stack capable of conveying hot gases generated in conjunction with industrial endeavors to a height within the atmosphere sufficient to meet current pollution standards, as well as providing a means of damping movement of said stack due to internally or externally generated forces plus providing means for extracting energy from gases passing through said stack for utilization outside of the stack environment as well as providing means for converting the solar energy which strikes the exterior surface of the chimney stack into a source of energy for utilization outside of the chimney stack environment.

Prior to the present invention, industrial chimney stacks were known, but of a design which did not lend themselves to the advantages and overall efficiencies achievable in conjunction with the present invention.

It is in the context of the above that one of the primary objectives of the present invention is to create a new and improved design associated with the fabrication and construction of a chimney stack which is capable of conveying hot gases generated in conjunction with industrial endeavors to a height within the atmosphere sufficient to meet current pollution standards so as to overcome problems currently existing in the prior art.

It is another object of this invention to create a new and improved design associated with the fabrication and construction of a chimney stack whose design permits one to achieve the optimum exit velocity of gases independent of gas temperature by providing a means to vary the exit opening of said stack.

It is another object of this invention to create a new and improved design associated with the fabrication and construction of a chimney stack wherein damping means are provided at the base of said stack to absorb energy generated by either internal or external forces which, if not dealt with, would cause a stack to vibrate.

It is another object of this invention to create a new and improved design associated with the fabrication and construction of a chimney stack wherein means are provided to extract energy from the hot gases passing through said stack in such a manner as to permit utilization of said extracted energy outside the environment of said stack.

It is another object of this invention to create a new and improved design associated with the fabrication and construction of a chimney stack wherein the hot gases passing through said stack are able to be maintained at a constant pressure and temperature level at various operating loads and gas efflux velocities.

It is another object of this invention to create a new and improved design associated with the fabrication and construction of a chimney stack wherein means are provided for converting the solar energy which strikes the exterior surface of the chimney stack into a useable energy form for utilization outside of the chimney stack environment.

The objects and advantages of the invention are set forth in part herein and in part will be obvious herefrom, or may be learned by practice of the invention, the same being realized and attained by means of the instrumentalities and combinations pointed out in the appended claims.

The invention consists in the novel parts, constructions, arrangements, combinations and improvements herein shown and described.

SUMMARY OF THE INVENTION

Briefly described, the present invention relates to an improved design associated with the fabrication and construction of a chimney stack capable of conveying hot gases generated in conjunction with industrial endeavors to a height within the atmosphere sufficient to meet current pollution standards.

As herein preferably embodied, the chimney stack herein described draws upon the prior art as far as the design and construction of the stack proper is concerned, however, it incorporates at the top of said stack in one embodiment of the invention, a multi-leaf, truncated cone arrangement wherein there is created a means to selectively adjust the size of the opening existing at the top of said stack, thereby creating the ability to selectively maintain constant pressure and temperature levels within said stack for various operating loads and gas efflux velocities resulting in the ability to achieve maximum plume rise of the existing gases independent of gas temperature and gas velocity.

In addition, there is utilized in the design and construction of said stack, means to absorb energy resulting from stack vibrational movements, said means being the utilization of material capable of absorbing energy at the anchor bolt locations of the stack.

Furthermore, there is provided within said overall design, and in accordance with the invention, an inner liner associated with said stack of a waffle type design wherein a sealed liquified system is provided such that liquid passing through said system has transferred to it thermal energy from gases passing through said stack, said heated liquid then being processed by way of a heat exchanger thereby providing a source of thermal energy capable of being utilized in applications external to the stack environment.

Additionally, there is further provided within the overall design of said stack the capability of providing a waffle type sealed liquified system as part of the exterior design of said stack capable of converting the solar energy which strikes the exterior surface of said stack into a source of energy capable of utilization outside of the stack environment.

The accompanying drawings referred to herein and constituting a part thereof, are illustrative of the invention but not restrictive thereof, and, together with the description, serve to explain the principles of the invention.

BRIEF DESCRIPTION OF THE DRAWINGS

FIG. 1 is a front elevational view of the chimney stack constructed in accordance with the invention.

FIG. 2 is a partial elevational view of the chimney stack illustrated in FIG. 1 depicting the uppermost portion of the chimney stack, there being a partial cutaway of said view so as to illustrate a portion of the interior of the multi-leaf, truncated cone-like structure positioned at said location.

FIG. 3 is a top elevational view of the multi-leaf, truncated cone-like structure depicted in FIG. 2.

DESCRIPTION OF A PREFERRED EMBODIMENT

Figure 4:
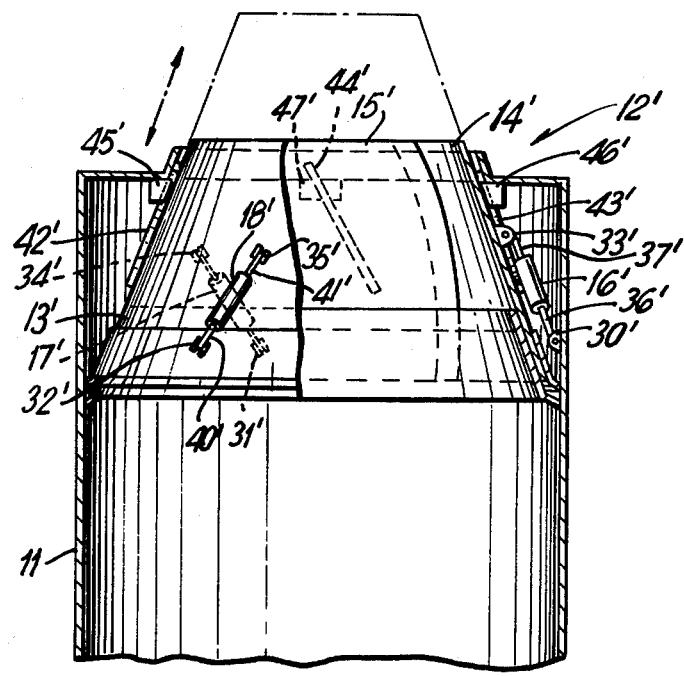
FIG. 4 is a cross-sectional view of an alternative embodiment of the multi-leaf, truncated cone-like structure depicted in FIG. 2.

Referring now more particularly to the embodiment of the above invention illustrated in the accompanying drawings, there is illustrated in FIG. 1 a chimney stack fabricated and constructed in accordance with the instant invention and indicated generally by reference numeral "10".

In accordance with the invention, chimney stack 10 comprises an upright outer conical structural column member 11 constructed of any well-known structural material commonly used in the prior art, be it steel, brick or otherwise, the purpose of said upright outer conical structural column member 11 being that of providing a structural housing for providing a defined conduit for the passage of hot gases into the atmosphere.

It should be noted that proper stack gas efflux velocity at all load levels will result in a greater plume height thereby permitting the dispersion and dilution of emitted gases at the greatest height possible thus resulting in optimum air pollution control. As is known in the prior art, the effective height to which gases rise comprises two components, one being the height to which said gases are carried within the stack itself, plus the plume rise, which is a function of two variables, to wit: the differential in temperature between emitted gases as compared with the temperature of the surrounding environment (thermal buoyancy) and the velocity of said emitted gases.

As is obvious, the greater the height which said emitted gases can reach as a result of the above factors, the better one is able to meet satisfactory air pollution control standards.

In accordance with this invention, the instant design seeks to achieve the ability to control the height to which emitted gases will reach within the atmosphere by providing the ability to selectively adjust for variations in gas velocity as well as gas temperature.

In accordance with the invention, there is depicted in FIG. 2 a partial elevational view of the chimney stack illustrated in FIG. 1 depicting the uppermost portion of the chimney stack, wherein there is provided, at the top opening of stack 10, a multi-leaf, truncated cone 12 affixed to the top of stack 10, cone 12 consisting of three overlapping, curved, segmental leaf members 13, 14 and 15, leaf members 13, 14 and 15 being arranged so as to permit the edges thereof to overlap each other, thereby providing a continuous but segmented surface in the shape of a cone, capable of having the surfaces of said segmented leaf members slide, one upon the other, such that in so doing, there can be altered the size of the opening at the top of said cone formed by said configuration.

In keeping with the invention and as illustrated in FIG. 3, leaf members 13, 14 and 15 are selectively moved in conjunction with drive means 16, 17 and 18 respectively so as to either provide a small opening at the top of stack 10, or in the alternative, a larger opening, depending upon the desires of the stack operator. As a result of the ability to selectively determine the size of the opening at the top of stack 10, there is the ability to effectively adjust within prescribed limits the plume rise of the gases emitted from stack 10.

In keeping with the invention, drive means 16, 17 and 18 are selectively actuated in unison thereby causing uniform movement of leaf members 13, 14 and 15 into selective positions, the angular positioning of said leaf members in accordance with a cone-like design resulting in the ability to selectively determine within prescribed limits the size of the opening at the top of stack 10.

In conjunction with the invention, drive means 16, 17 and 18 can be any well known prior art means capable of causing leaf members 13, 14 and 15 to selectively move as hereinbefore described, and as herein preferably embodied, are hydraulically operated drive means having one end thereof being pivotally affixed by structural coupling means 30, 31 and 32 respectively, to outer conical structural column member 11 while the other end thereof is pivotally affixed by structural coupling means 33, 34 and 35 respectively to the interior surface of leaf members 13, 14 and 15 respectively, such that upon actuation of drive means 16, 17 and 18 respectively so as to cause leaf members 13, 14 and 15 to move in a fashion so as to narrow the opening at the top of the cone so formed by their configuration, shaft members 36 and 37 respectively of drive means 16, shaft members 38 and 39 respectively of drive means 17 and shaft members 40 and 41 respectively of drive means 18 extend outward from the housing drive means 16, 17 and 18 respectively forcing leaf members 13, 14 and 15 respectively to move upward while being guided by having track means 42, 43 and 44 respectively which are affixed to the interior surface of leaf members 13, 14 and 15 respectively guide upon slot means 45, 46 and 47 respectively which are structurally affixed to outer conical structural column member 11 at its uppermost location. In a similar manner, the opening at the top of stack 10 can be enlarged by reversing the above described process by causing shaft members 36, 37, 38, 39, 40 and 41 of drive means 16, 17 and 18 respectivly to retract inward into the housing of said drive means.

In FIG. 4 and in accordance with the invention, there is illustrated an alternative embodiment of the invention wherein the cone-like structure appearing at the top of stack 10 is contained within the structural confines of the stack in question, the overlap and movement of the leaf members associated with FIG. 4 being identical in concept and design to that set forth in conjunction with the embodiment illustrated in FIG. 2, the variation being that the cone structure referred to above does not extend beyond the defined structure of outer conical structural column member 11.

As depicted in FIG. 4, leaf members 13' and 14' respectively are illustrated, their positioning being such that the overall dimensions of multi-leaf truncated cone 12' is contained within the overall dimensions of chimney stack 10. In keeping with the invention, drive means 16', 17' and 18' are pivotally affixed by structural coupling means 30', 31' and 32' respectively to outer conical structural column member 11, while the other end thereof is pivotally affixed by structural coupling means 33', 34' and 35' respectively to the exterior surfaces of leaf members 13', 14' and 15' respectively, such that upon actuation of drive means 16', 17' and 18' respectively so as to cause leaf member 13', 14' and 15' to move in a fashion so as to alter the size of the opening at the top of the cone so formed by the configuration, the shaft members of drive means 16', 17' and 18' either extend outward from the respective housings or retract therein, depend upon whether or not the size of the opening is to be decreased or increased, respectively, said leaf members being guided by track means 42', 43' and 44' respectively which are affixed to the exterior surface of leaf members 13', 14', and 15' respectively, said track means guiding upon slot means 45', 46' and 47' respectively which are structurally affixed to outer conical structural column member 11, at its uppermost location.

Figure 5:
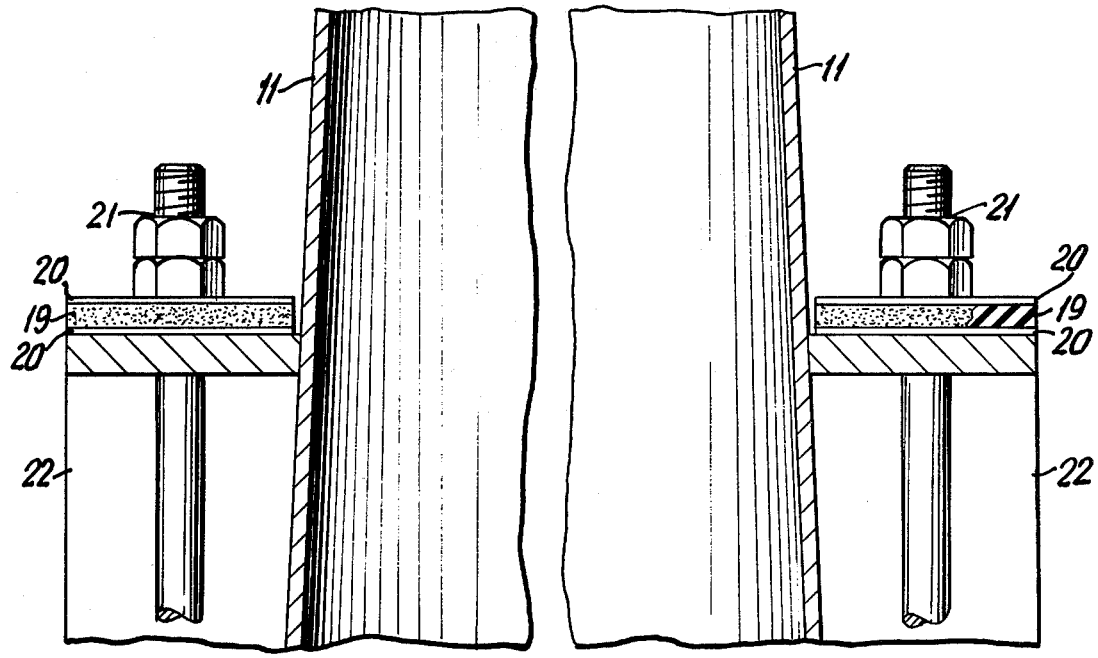
FIG. 5 is a cross-sectional view taken along Line 5—5 of FIG. 1 depicting the utilization of a dampening means at the base of said chimney stack.

In FIG. 5, there is illustrated a means whereby, in conjunction with this invention, dampening means are provided at the base of stack 10 so as to provide means for absorbing energy related to stack vibrational movement. In keeping with the invention, rubber impregnated cloth material 19 is sandwiched between the anchoring plates 20 appearing at the base of stack 10 which are held in position by anchor bolts 21 which are embedded into the base 22 of stack 10. As a result of the ability of the rubber impregnated cloth material 19 to absorb energy by it permitting itself to compressed beyond its original shape, energy associated with vibrational movement of stack 10 can in fact be dissipated thereby avoiding structural damage to said stack.

Figure 6:
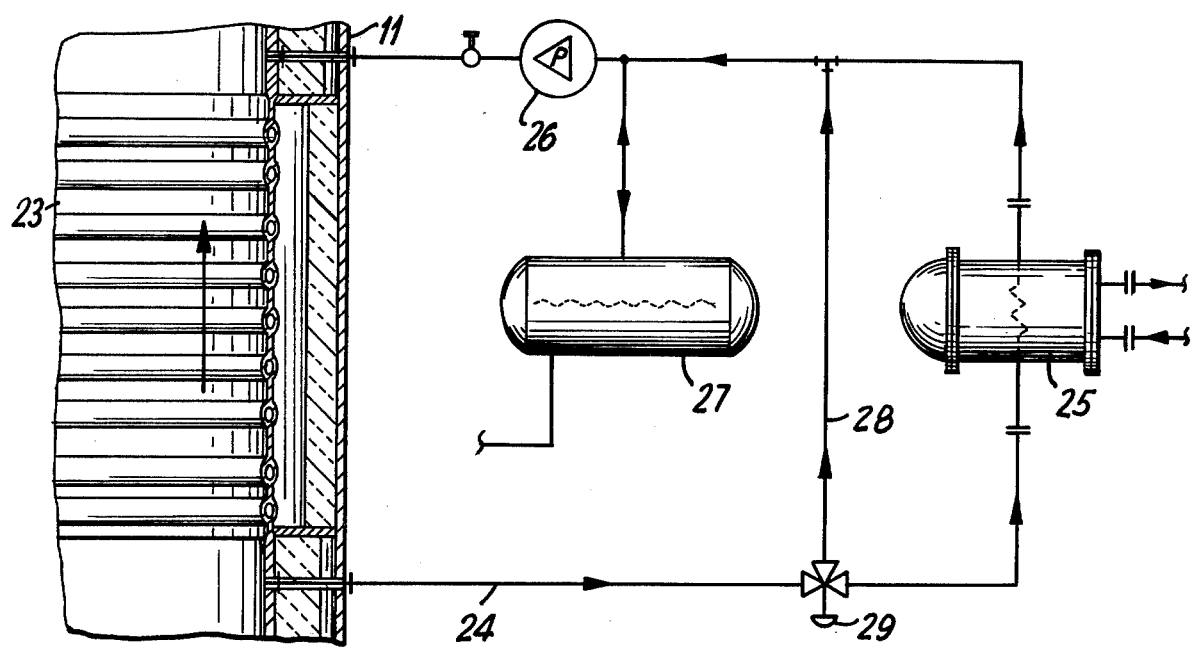
FIG. 6 depicts a closed heat transfer system constructed in accordance with the invention wherein energy is extracted from gases flowing through the chimney stack and transferred via a heat exchanger into another medium for utilization outside of said stack environment.

As illustrated in FIG. 6, a heat transfer system is within stack 10 which is capable of extracting energy from the hot gases passing through said stack and converting it for use outside of the stack structure.

More particularly, there is contained a waffle-like liner 23 which is positioned throughout the interior surface of stack 10 which is part of a closed system containing a heat transfer media capable of heat transfer. As illustrated in FIG. 6, said heat transfer media passes through waffle-like liner 23 within the interior of stack 10, passes out of said stack via conduit means 24 to heat exchanger 25 through pumping means 26 and back into said stack to waffle-like liner 23, thus providing a closed system.

As is well known within the prior art, means are provided for having a reservoir 27 for supplying to within said system additional heat transfer media if and when needed as well as a by-pass 28 capable of providing a means for said heat transfer media to by-pass heat exchanger 25 if desired, valve means 29 being utilized to accomplish the above.

Figure 7A:
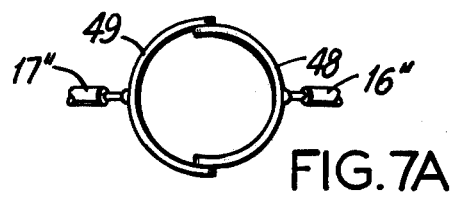
FIG. 7A is a top elevational view of the adjustable supporting member utilized in the alternative embodiment of the multi-leaf truncated cone-like structure depicted in FIG. 7.
Figure 7:
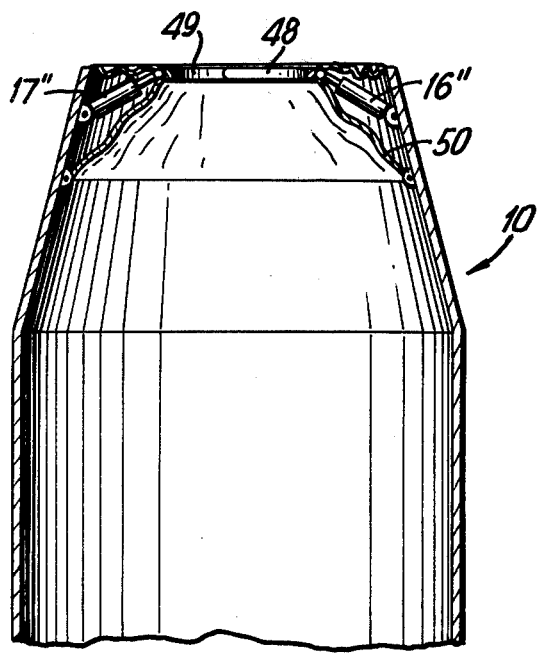
FIG. 7 is a partial cross-sectional view of an alternative embodiment of the multi-leaf, truncated cone-like structure depicted in FIG. 2.

As illustrated in FIG. 7, there is an alternative embodiment to the invention herein described wherein leaf members 13, 14 and 15 as illustrated in FIGS. 2 and 3 are replaced with a non-combustible cloth-like material 50, capable of providing a non-rigid structure in the shape of a cone having a selectively adjustable opening at the top of the cone-like structure so as to accomplish the ability to selectively manipulate the size of the stack opening at its top so as to achieve maximum plume height for emitted gases.

By having hydraulically actuated drive means 16" and 17" be of a construction previously described herein, said drive means being pivotally affixed to the interior portion of stack 10 at its uppermost opening, there is the ability to selectively alter the stack opening at its top by, as preferably embodied herein, causing semi-circular members 48 and 49 to slide adjacent to each other thereby forming a circular opening the size of which is selectively controlled wherein, non-combustible cloth-like material 50 is affixed at the top portion of its cone-like shape to semi-circular ring members 48 and 49 as well as having the lower portion of the cone-like structure of said non-combustible cloth-like material 50 mechanically affixed to the interior circumference of the top of stack 10.

Figure 8:
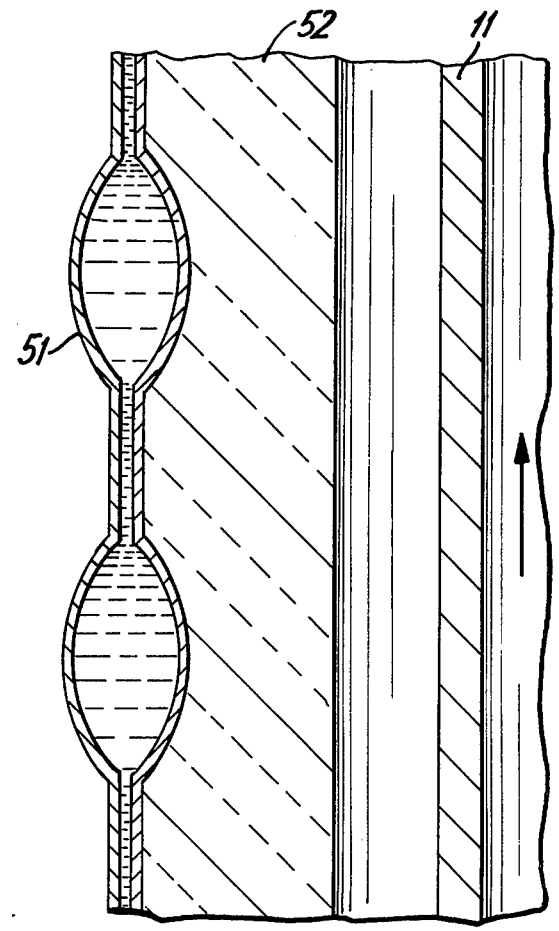
FIG. 8 is a partial cross-sectional view of an alternative embodiment of the invention taken along Line 8—8 of FIG. 1 wherein means are provided for converting the solar energy which strikes the exterior surface of the chimney stack into a useable energy form for utilization outside of the chimney stack environment.

As illustrated in FIG. 8 there is depicted a heat transfer system wherein solar energy striking the exterior of stack 10 heats a liquid which in turn is converted into usable energy for applications outside the outer structure.

More particularly, there is illustrated a waffle-like structure 51 which is affixed to the exterior of stack 10, there being insulative material 52 positioned between up-right outer conical structural column member 11 and waffle-like structure 51, waffle-like structure 51 being positioned adjacent to the exterior surface of said stack 10, the extent to which being selectively determined based upon desire design criteria, said waffle-like structure 51 providing a closed system containing a heat transfer media capable of heat transfer, said heat transfer media being conducted through a heat exchanger similar to that set forth in FIG. 6 herein, for conversion into a usable energy source for applications outside the stack environment in a manner well known in the prior art. As herein preferably embodied, the walls of waffle-like structure 51 can be constructed of materials well known in the prior art which are specifically designed to provide for the gathering of solar energy.

The preceding description and accompanying drawings relate primarily to a specific embodiment of the invention, and the invention in its broader aspect should not be so limited to one specific embodiment as herein shown and described, but the departures may be made therefrom within the scope of the accompanying claims without departing from the principles of the invention and without sacrificing its chief advantages.

I claim:

1. A chimney stack conveying hot gases comprising the following:
   (a) An outer conical structural column member having a base portion and an upper portion wherein means are provided for introducing into said conical structural column member emitted gases that are to be conveyed into the atmosphere by said chimney stack;
   (b) A multi-leaf truncated cone member affixed to the upper portion of said outer conical structural column member wherein said multi-leaf truncated cone member having its configuration selectively altered so as to cause the opening at the top of said multi-leaf truncated cone member to adjust in size, wherein said multi-leaf truncated cone member comprises:
  (i) A plurality of leaf members, curved and positioned in an overlapping configuration with each other so as to define a truncated cone, said leaf members having the edges of their respective overlapping surfaces slide across one another such that the truncated cone defined by said configuration being selectively altered as to its overall dimensions such that the diameter of the top opening of said truncated cone configuration can be selectively modified;
  (ii) Means for selectively moving in unison each of said leaf members such that the respective overlapping surfaces of said leaf members slide across one another so as to selectively modify the multi-leaf truncated cone configuration;
  (iii) Structural means for affixing said multi-leaf truncated cone member to the top of said outer conical structural column member so as to permit the selective movement of each of said leaf members;
(c) Damping means structurally affixed at the base portion of said outer conical structural column member so as to provide a means for absorbing energy from the said outer conical structural column member; and
(d) Means for extracting thermal energy from the hot gaseous medium passing through the interior of said outer conical structural column member for utilization as a source of energy exterior to said chimney stack.

2. A chimney stack conveying hot gases as set forth in claim 1 wherein the multi-leaf truncated one member affixed to the upper portion of said outer conical structural column member extends beyond the diameter dimensional limits of said upper portion of said chimney stack.

3. A chimney stack conveying hot gases as set forth in claim 1 wherein the multi-leaf truncated cone member, is positioned within the diameter dimensional limits of said upper portion of said chimney stack.

4. A chimney stack conveying hot gases as set forth in claim 1 wherein the multi-leaf truncated cone member consists of three (3) leaf members.

5. A chimney stack conveying hot gases as set forth in claim 1 wherein means are affixed to the exterior of said outer conical structural column member extracting solar energy from the environment surrounding said chimney stack and utilizing said extracted energy as a source of energy removed from said chimney stack.

* * * * *